United States Patent
Horino et al.

[15] 3,694,525
[45] Sept. 26, 1972

[54] VINYL CHLORIDE POLYMER COMPOSITIONS

[72] Inventors: Hiroshi Horino; Masato Matsuo, both of Kawasaki, Japan

[73] Assignee: The Japanese Geon Company, Ltd., Tokyo, Japan

[22] Filed: June 25, 1971

[21] Appl. No.: 156,995

[30] Foreign Application Priority Data

June 29, 1970 Japan..................45/55938

[52] U.S. Cl. .........260/899, 260/86.1 E, 260/89.5 R, 260/876 R, 260/890, 260/891
[51] Int. Cl...............................C08f 29/24
[58] Field of Search.......................260/899, 89.5 R

[56] References Cited

UNITED STATES PATENTS 3,536,788  10/1970  Hurwitz et al. ............260/890
3,485,775  12/1969  Cenci et al.................260/899

Primary Examiner—Murray Tillman
Assistant Examiner—C. J. Seccuro
Attorney—Sherman and Shalloway

[57] ABSTRACT

A vinyl chloride polymer composition comprising (I) a vinyl chloride polymer and (II) a polymer selected from the group consisting of the homopolymers of tricyclo $(5, 2, 1, 0^{2,6})$ decane-8-yl-methacrylate and the copolymers of tricyclo $(5, 2, 1, 0^{2,6})$ decane-8-yl-methacrylate and methyl methacrylate.

4 Claims, No Drawings

VINYL CHLORIDE POLYMER COMPOSITIONS

This invention relates to vinyl chloride polymer compositions. More specifically, the invention relates to vinyl chloride polymer compositions of superior heat resistance consisting of a vinyl chloride polymer and either a homopolymer of tricyclo $(5, 2, 1, 0^{2,6})$ decane-8-yl-methacrylate (TCDM) or a TCDM-methyl methacrylate copolymer.

The vinyl chloride polymers, e.g., polyvinyl chloride, possess per se good physical properties, excelling especially in chemical resistance, weatherability, fire resistance, transparency and adhesiveness. In additions, since compositions ranging from those of high to low hardness can be obtained as desired in accordance with their intended use, they are of great importance as thermoplastic resins.

However, the vinyl chloride polymers, despite their possession of the various excellent properties such as noted, also possess shortcomings in that they are inferior in their heat resistance and impact strength. For instance, the softening temperature of the usual commercially available vinyl chloride polymer of a degree of polymerization on the order of 1,200 and not incorporated with a plasticizer is ca. 75° C. at most. Further, the softening temperature of a vinyl chloride polymer composition containing an impact resistance assistant such as an acrylonitrile-butadiene-styrene copolymer or a methacrylate-butadiene-styrene copolymer is ca. 70° C. at most.

A number of proposals for improving the heat resistance of the vinyl chloride polymers have already been made. For example, there is a method in which the vinyl chloride polymers are submitted to an after chlorination treatment or there is a method in which the vinyl chloride polymer are blended with other polymers. However, while that in which the after chlorination treatment is given has the merit of improving the heat resistance of the vinyl chloride polymer, it has, on the other hand, such disadvantages that a decline is brought about in such properties as the processability, processing thermal stability, elongation and impact strength of the polymer.

An object of the present invention is to provide by the blending method vinyl chloride polymer compositions having excellent heat resistance and moreover not having the hereinbefore noted shortcomings.

Other objects and advantages of the invention will become apparent from the following description.

We found that a composition consisting of the vinyl chloride polymer and a TCDM homopolymer would be such that the foregoing objects of the invention could be achieved. That is, notwithstanding the possession by the TCDM polymer of such advantages as high softening point and hardness as well as a glasslike transparency, because of its shortcomings such as that difficulty is experienced in its kneading and that it provides products which are very fragile, the TCDM polymer was known to be restricted in its use to only special areas. We however found that this TCDM homopolymer had a good compatibility with the vinyl chloride polymers and that the blended composition of the two resulted in raising the softening point greatly without impairment of the good properties of the vinyl chloride polymer.

We also found that the objects of the invention could be achieved by incorporating a TCDM-methyl methacrylate copolymer in the vinyl chloride polymer instead of the TCDM homopolymer. And in this case it was found that the dispersion of the aforesaid copolymer in the vinyl chloride polymer was easy and that the softening point of the vinyl chloride polymer composition was raised still higher. The TCDM-methyl methacrylate copolymer can be one which consists of at least 1 percent by weight of TCDM and not more than 99 percent by weitht of methyl methacrylate.

A copolymer consisting of TCDM and up to a half amount thereof of a copolymerizable monomer other than methyl methacrylate and a copolymer consisting of TCDM, methyl methacrylate and up to a half amount of the total amount TCDM and methyl methacrylate of another copolymerizable monomer can be provide the vinyl chloride polymer composition with heat resistance in like manner as in the case with the aforesaid TCDM homopolymer and the TCDM-methyl methacrylate copolymer. As such copolymerizable monomers, mention can be made of styrene; substituted styrenes such as alphamethyl styrene, vinyl toluene, chlorostyrene, etc.; acrylonitrile; acrylonitrile derivatives such as methacrylonitrile, etc.; methacrylic esters such as ethyl methacrylate, butyl methacrylate, etc.; and acrylic esters such as methyl acrylate, ethyl acrylate, butyl acrylate, etc. It goes without saying that tricyclo $(5, 2, 1, 0^{2,6})$ decane-8-yl-acrylate and tricyclo $(5, 2, 1, 0^{2,6})$-decane-8-yl-ethacrylate are also useable.

For brevity the TCDM homopolymer and TCDM copolymers will be generically referred to hereinafter as merely TCDM polymers.

The preparation of the TCDM polymer is carried out by the customary emulsion polymerization and suspension polymerization methods. The foregoing polymer can be obtained by these polymerization methods as a powder which is readily blended with the vinyl chloride polymers.

In the case of the emulsion polymerization method, the conventional anionic, cationic or nonionic surfactants can be used singly or in suitable combinations as the emulsifier, and the usual peroxides, azo compounds and redox catalysts can be used as the polymerization initiator. On the other hand, as the chain transfer agent, which is usually used for adjusting the degree of polymerization, useable are such, for example, as the mercaptan compounds. And as a builder, sodium pyrophosphate and sodium carbonate may be added. The so polymerized polymeric latex can then be made into a polymeric powder by spray-drying or by coagulation by addition to an aqueous solution of an inorganic electrolyte such as calcium chloride or aluminum sulfate and an inorganic acid such as hydrochloric, sulfuric or phosphoric acid, followed by washing and drying.

In the case of the suspension polymerization method, partially saponified polyvinyl alcohol, sodium polyacrylate, methyl cellulose, etc. are used in customary manner as the dispersing agent, and as the polymerization initiator and chain transfer agent, those used in the above mentioned emulsion polymerization method are used.

The term "vinyl chloride polymer", as used herein, is meant to include, in addition to the vinyl chloride homopolymer, the copolymer of a major amount of vinyl chloride and a minor amount of a monoolefin monomer copolymerizable therewith (e.g., vinyl acetate, vinylidene chloride, ethylene, propylene and the like), and the vinyl chloride graft copolymer, which is obtained by polymerizing vinyl chloride in the presence of a rubbery polymer.

The proportion in which the vinyl chloride polymer and the TCDM polymer is blended in the invention composition is not particularly restricted but is decided in accordance with the intended use of the composition. However, in the case where the object is to improve the heat resistance of the polymer composition, the use of 10 to 60 percent by weitht of the TCDM polymer to 90–40 percent by weight of the vinyl chloride polymer is preferred. Further, the usually used vinyl chloride polymer additives such as heat stabilizer, impact resistance assistant, various processing assistants, blowing agent, lubricant, mold release, etc., can be added.

The blending of the vinyl chloride polymer and the TCDM polymer may be carried out during the customary roll kneading step or may be carried out in a powdered or latex state of the components. The choice can be made by those skilled in the art in consideration of the convenience and advantages involved.

When the vinyl chloride polymer is incorporated with a known impact resistance assistant consisting of a butadiene type polymer such as an acrylonitrile-butadienestyrene copolymer or a methyl methacrylate-butadienestyrene copolymer, along with the TCDM polymer, satisfactory improvements are brought about in both the heat resistance and impact strength. A composition of this kind can be prepared either by admixing the impact resistance assistant butadiene type polymer and the TCDM polymer each separately to the vinyl chloride polymer or by first co-coagulating a butadiene type polymer latex and a TCDM polymer latex and then blending this with the vinyl chloride polymer.

The following non-limitative examples are given by which the invention is more specifically illustrated.

REFERENCE EXAMPLE I

Preparation of tricyclo (5, 2, 1, $0^{2,6}$) decane-8-ol.

One kg of 25 percent sulfuric acid was added to 308 grams of dicyclopentadiene, and the reaction was carried out for 6 hours at about 108° C. under reflux. The reaction liquid was then separated with a separating funnel and vacuum distilled at 92°–93° C./3mm Hg to obtain 268 grams of tricyclo (5, 2, 1, $0^{2,6}$)-3-decene-8-ol.

Next, a 1-liter autoclave was charged with 20 grams (as amount of alloy) of a developed Raney nickel catalyst, 250 ml of ethyl alcohol and 214 grams of tricyclo (5, 2, 1, $0^{2,6}$)-3-decene-8-ol, after which 100 kg/cm² of hydrogen was also charged and the reaction was carried out for 6 hours at 125° C. while agitating the system. This was followed by removal of the catalyst and vacuum distillation, whereupon was obtained a colorless and transparent, viscous tricyclo (5, 2, 1, $0^{2,6}$) decane-8-ol ($n_D^{25}$ = 1.5100) of 105.5° C./5.5 mm Hg, in an amount of 208 grams.

REFERENCE EXAMPLE II

Preparation of TCDM.

A 1-liter flask was charged with a mixture consisting of 152.1 grams (1.0 mol) of tricyclo (5, 2, 1, $0^{2,6}$) decane-8-ol prepared as hereinabove described, 103.5 grams (1.2 mols) of methacrylic acid, 300 ml of benzene, 2 grams of hydroquinone and 20 grams of p-toluenesulfonic acid. The reaction was then carried out while heating under reflux and distilling off externally of the reaction system the resulting water as an azeotropic mixture with benzene, the reaction being continued until no further distillation of water takes place. 7.5 Hours were required for the foregoing reaction, and 19 ml of water was formed. An aqueous sodium carbonate solution was added to the reaction mixture after it was cooled and the unreacted methacrylic acid was removed. The reaction mixture was then dried with sodium sulfate followed by vacuum distillation, whereupon was obtained colorless and transparent TCDM ($n_D^{25}$ = 1.4927, $d_4^{25}$=1.033) of 132° – 133° C./5.5 mm Hg in an amount of 175 grams.

EXAMPLE I

The TCDM polymer used in the invention was obtained in accordance with the following recipe. The composition of the monomers was as shown in Table 1.

POLYMERIZATION RECIPE

| | | |
|---|---|---|
| Monomer | parts by weight | 100 |
| Distilled water | parts by weight | 300 |
| Sodium dialkylsulfonate | parts by weight | 1.5 |
| Sodium pyrophosphate | parts by weight | 0.5 |
| t-Dodecyl mercaptan | parts by weight | 0.3 |
| Potassium persulfate | parts by weight | 0.5 |
| Polymerization temperature | °C. | 60 |
| Polymerization time | hr. | 30 |
| Polymerization yield | % by weight | 95 |

TABLE 1

| Sample | Composition of Monomers (%) | |
|---|---|---|
| | TCDM | Methyl methacrylate |
| A | 100 | 0 |
| B | 90 | 10 |
| C | 80 | 20 |
| D | 70 | 30 |
| E | 60 | 40 |
| F | 50 | 50 |
| G | 20 | 80 |
| H | 10 | 90 |
| PMMA* | 0 | 100 |

* Polymethyl methacrylate.

An aqueous dispersion of the TCDM polymer obtained by the foregoing polymerization recipe was salted out and coagulated by adding it to an aqueous aluminum sulfate solution and thereafter water-washed and dried in customary manner to obtain the sample powder.

The so obtained sample powder was blended with polyvinyl chloride in accordance with the following recipe. After roll-kneading the composition for 10 minutes at 185° C., it was tested for its softening temperature. The softening temperature was measured in accordance with JIS K 6745. The results obtained are shown in Table 2.

BLENDING RECEIPE

| | | |
|---|---|---|
| Polyvinyl chloride ($\bar{P}$=1050)* | parts by weight | 70 |
| TCDM polymer sample | parts by weight | 30 |
| Tin type stabilizer(T.V.S. #N.2000F) | parts by weight | 3 |
| Stearyl alcohol | parts by weight | 1 |

* $\bar{P}$ = average degree of polymerization

TABLE 2

| Experiment No. | TCDM Polymer Sample | Softening Temperature (°C.) |
|---|---|---|
| 1 | A | 86 |
| 2 | B | 91 |
| 3 | C | 95 |
| 4 | D | 99 |
| 5 | E | 98 |
| 6 | F | 92 |
| 7 | G | 90 |
| 8 | H | 84 |
| 9 | PMMA | 81 |
| 10 | not used | 76 |

It is apparent from Table 2 that, as compared with the vinyl chloride polymer compositions not incorporated with the TCDM polymer i.e., the composition incorporated with polymethyl methacrylate (Experiment No. 9) and the vinyl chloride homopolymer (Experiment No. 10), the vinyl chloride polymer compositions incorporated with the TCDM composition (Experiment Nos. 1 – 8) demonstrate a superior heat resistance.

EXAMPLE II

TCDM polymers were obtained by operating as in Example I, except that the compositions of the monomers charged were as indicated in Table 3. Fifty parts by weight of the respective TCDM polymers and 50 parts by weight of polyvinyl chloride ($\bar{P}$=1050) were blended and kneaded as in Example I, followed by which the softening temperature was measured. The results obtained are shown in Table 3.

TABLE 3

| Experiment No. | 1 | 2 | 3 | 4 | 5 |
|---|---|---|---|---|---|
| TCDM polymer sample | I | J | K | L | noted used |
| Composition of monomers: (parts by weight) | | | | | |
| TCDM | 80 | 60 | 60 | 40 | — |
| methylmethacrylate | 10 | 20 | 35 | 35 | — |
| styrene | 8 | 15 | 4 | 20 | — |
| Acrylonitrile | 2 | 5 | 1 | 5 | — |
| Softening temperature (°C.) | 109 | 105 | 104 | 99 | 76 |

We claim:

1. A vinyl chloride polymer composition comprising (I) a vinyl chloride polymer selected from the group consisting of vinyl chloride homopolymer and copolymers of a major amount of vinyl chloride and a minor amount of a monoolefinically unsaturated monomer copolymerizable therewith and (II) a polymer selected from the group consisting of the homopolymers of tricyclo (5, 2, 1, $0^{2,6}$) decane-8-yl-methacrylate and the copolymers of tricyclo (5, 2, 1, $0^{2,6}$) decane-8-yl-methacrylate and methyl methacrylate.

2. A vinyl chloride polymer composition comprising 90 – 40 percent by weight of a vinyl chloride polymer selected from the group consisting of vinyl chloride homopolymer and copolymers of a major amount of vinyl chloride and a minor amount of a monoolefinically unsaturated monomer copolymerizable therewith and 10–60 percent by weight of a homopolymer of tricyclo (5, 2, 1, $0^{2,6}$) decane-8-yl-methacrylate.

3. A vinyl chloride polymer composition comprising 90 – 40 percent by weight of a vinyl chloride polymer selected from the group consisting of vinyl chloride homopolymer and copolymers of a major amount of vinyl chloride and a minor amount of a monoolefinically unsaturated monomer copolymerizable therewith and 10 – 60 percent by weight of a copolymer of tricyclo (5, 2, 1, $0^{2,6}$) decane-8-yl-methacrylate and methyl methacrylate.

4. A composition according to claim 3 wherein said copolymer consists of at least 1 percent by weight of tricyclo (5, 2, 1, $0^{2,6}$) decane-8-yl-methacrylate and not more than 99 percent by weight of methyl methacrylate.

* * * * *